United States Patent [19]

Payne

[11] 3,844,605

[45] Oct. 29, 1974

[54] VEHICLE ROOF CONSTRUCTION

[76] Inventor: John W. Payne, 1116 W. Centre Ave., Pontage, Mich. 49002

[22] Filed: Nov. 6, 1972

[21] Appl. No.: 304,077

[52] U.S. Cl............................ 296/137 R, D14/3 J
[51] Int. Cl............................................ B62d 25/06
[58] Field of Search............. 296/137 R, 1 R, 95 R; 40/129 C; D14/3 J

[56] References Cited
UNITED STATES PATENTS 2,606,381  8/1952  Wilson............................. 40/129 C
D181,254  10/1957  Heffelfinger....................... D14/3 J Primary Examiner—Robert R. Song
Attorney, Agent, or Firm—Woodhams, Blanchard and Flynn

[57] ABSTRACT

A roof construction for a vehicle, particularly for a panel-type structure or van. The roof construction includes a four-sided box-like structure which is open on the top and bottom and includes a pair of side panels which extend longitudinally along opposite edges of the van roof, and a pair of end panels fixedly interconnecting and extending between the side panels. Each of the panels is preferably constructed from a substantially rectangular base member, such as of plywood, and has a plurality of shingles fixedly secured thereto. The shingles are secured to the base member in a plurality of overlapping rows. The panels all extend upwardly and slope inwardly relative to the vehicle roof and the side panels and are fixedly connected by L-shaped brackets to a plurality of roof bars which extend transversely across the roof of the vehicle and are fixedly secured thereto.

9 Claims, 3 Drawing Figures

PATENTED OCT 29 1974 3,844,605

3,844,605

VEHICLE ROOF CONSTRUCTION

FIELD OF THE INVENTION

This invention relates to a roof construction for a vehicle and, in particular, to a roof structure adapted to be mounted on a panel-type truck or van.

BACKGROUND OF THE INVENTION

The present invention relates to a roof construction which is particularly designed for attachment to the vehicle, specifically a van, for permitting the exterior appearance of the van to be altered in a manner suitable to permit the van to be used in either promoting or assisting in the conduct of a particular business. As is well known, the various materials and structures selected for use in promoting or performing a business must be selected so as to have customer appeal, while at the same time the material or structure must be of a type which can be produced relatively inexpensively and which can be adapted to other existing equipment with a minimum amount of effort and expense.

Accordingly, it is an object of the present invention to provide a roof construction, particularly for a van-type vehicle, which can be attached to the van in an easy and efficient manner, and which can be effectively utilized in promoting a business.

A further object of the present invention is to provide a roof construction, as aforesaid, which can be easily and inexpensively manufactured, which is extremely durable and which can be mounted exteriorly of a vehicle without being adversely effected by weather or requiring structural changes in the basic vehicle.

Other objects and purposes of the present invention will be apparent upon reading the following specification and inspecting the accompanying drawings.

SUMMARY OF THE INVENTION

The objects and purposes of the present invention are met by providing a roof construction for a vehicle, particularly for a panel-type structure or van. The roof construction includes a four-sided box-like structure which is open on the top and bottom and includes a pair of side panels which extend longitudinally along opposite edges of the van roof, and a pair of end panels fixedly interconnecting and extending between the side panels. Each of the panels is preferably constructed from a substantially rectangular base member, such as of plywood and has a plurality of shingles fixedly secured thereto. The shingles are secured to the base member in a plurality of overlapping rows. The panels all extend upwardly and slope inwardly relative to the vehicle roof and the side panels are fixedly connected by L-shaped brackets to a plurality of roof bars which extend transversely across the roof of the vehicle and are fixedly secured thereto.

DETAILED DESCRIPTION

Figure 1:
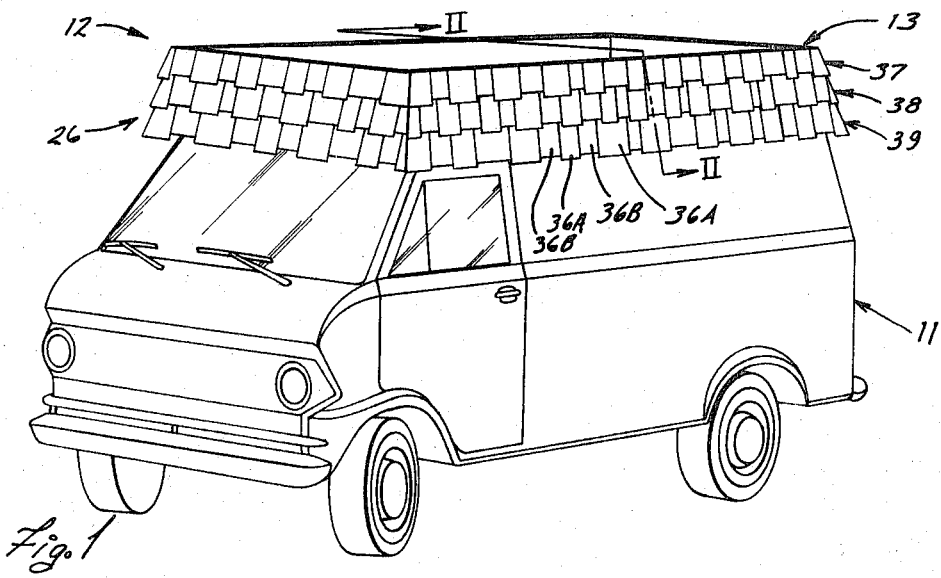
FIG. 1 is a perspective view of a van having a roof construction of the present invention mounted thereon.
Figure 2:
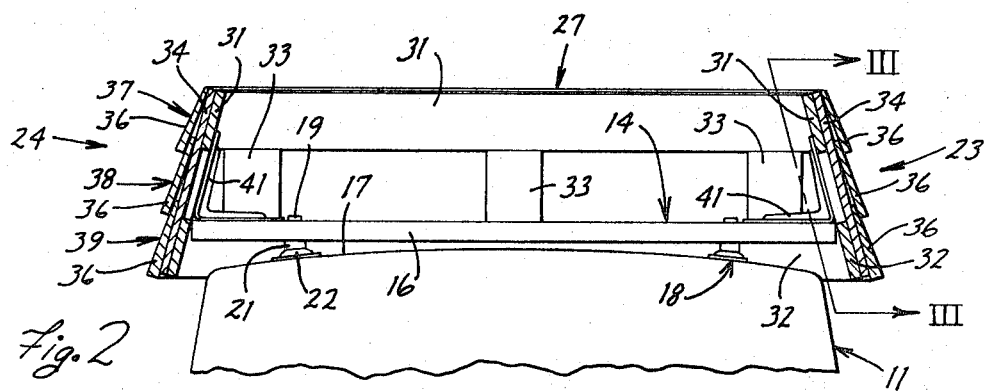
FIG. 2 is a fragmentary sectional view taken substantially along the line II—II of FIG. 1.

FIG. 1 illustrates a vehicle 11 of the type commonly referred to as a van or panel-type truck. The van 11 has a roof construction 12 mounted thereon in accordance with the present invention. The roof construction 12 comprises a foursided box-like structure 13 which is substantially open on the top and bottom sides thereof, and is fixedly attached to the van 11 by a plurality of mounting devices 14 (FIG. 2).

The mounting devices 14 each include an elongated support bar 16 which, as illustrated, is of tubular construction and extends transversely across the roof 17 of the van. The support bar 16, which has a length substantially equal to or slightly greater than the roof 17, is fixedly interconnected to the roof 17 by a plurality of clamping devices 18. In the illustrated embodiment, a clamping device 18 is located adjacent each end of the bar 16 for fixedly connecting same to the roof 17. The clamping device 18 includes a conventional threaded fastening element 19 extending through the bar 16 and through the roof 17 for secure attachment thereto. The threaded fastening element 19 extends through a spacer sleeve or bearing 21, which bearing is disposed in engagement with the roof by means of an intermediate seal member 22.

The mounting devices 14, of which there are preferably three or four of same extending across the vehicle and spaced longitudinally thereof, are fixedly interconnected to the opposite sides of the box-like structure 13 for fixedly anchoring and supporting same in position on the van 11. The box-like structure 13 specifically includes a pair of substantially identical side panels 22 and 23 which are disposed opposite one another and extend substantially longitudinally of the van adjacent the opposite edges thereof. The side panels 23 and 24 are in turn fixedly interconnected adjacent their opposite ends by front and rear panels 26 and 27 respectively, which panels are also substantially identical to the side panels 23 and 24 but are of shorter length. All of the panels 23, 24, 26 and 27 are of substantially similar structure and thus the structural features of only one of the panels will be considered.

Particularly, each of the panels includes a pair of substantially parallel and vertically spaced mounting members 31 and 32 extending lengthwise of the panel, which mounting members in turn are fixedly connected by a plurality of spacers 33 which extend between the mounting members 31 and 32 each have approximately four spaces 33 disposed lengthwise of the panel, whereas the front and rear panels 26 and 27 each have approximately two or three spacers disposed lengthwise thereof. The members 31 and 32 and the spacers 33 are preferably constructed of wood, but may be constructed of any other suitable structural material.

Each roof panel also has a substantially rectangular base member 34 secured to the outside of the frame defined by the mounting members 31 and 32 and the spacers 33. The base member 34 is preferably constructed of wood, such as from thin plywood, and thus provides the base upon which a plurality of shingles 36 are secured, as by nailing.

The shingles 36 are preferably of wood, being of the type commonly referred to as cedar shakes. The individual shingles 36 are preferably disposed in a plurality of elongated rows which extend in the lengthwise direction of the individual roof panels. In the illustrated embodiment, each roof panel is is provided with three rows of shingles thereon, which rows have been designated 37, 38 and 39 for purposes of identification.

Figure 3:
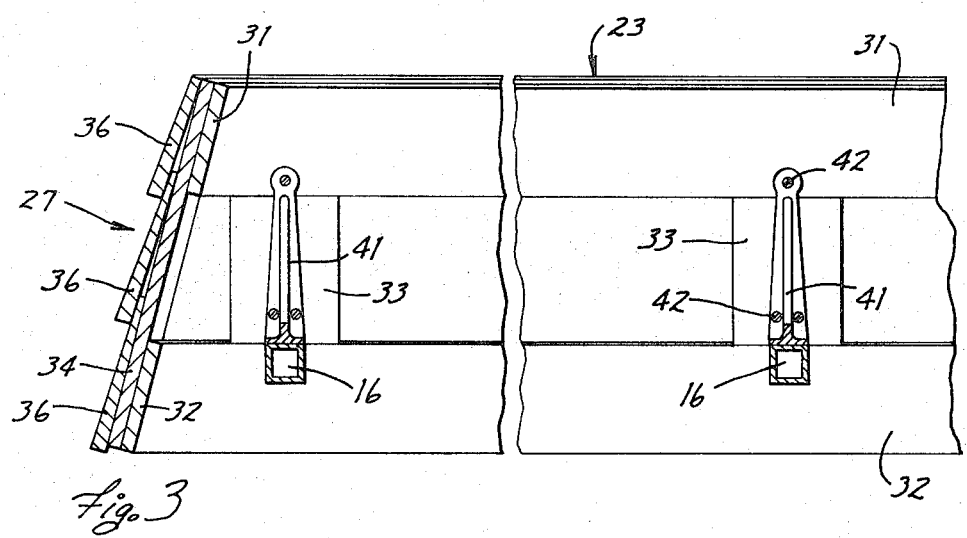
FIG. 3 is an enlarged, fragmentary sectional view taken substantially along the line III—III of FIG. 2. Certain terminology will be used in the following description for convenience in reference only and will not be limiting. The words "upwardly," "downwardly," "rightwardly" and "leftwardly" will refer to directions as appearing in the accompanying drawings. The words "inwardly" and "outwardly" will refer to directions toward and away from the geometric center of the overall roof construction and designated parts thereof. Said terminology will include the words above specifically mentioned, derivatives thereof and words of similar import

The shingles in the adjacent rows are preferably mounted on the base 34 so that the rows overlap one another in a somewhat conventional manner. Specifically, as illustrated in FIG. 3, the lowermost edges of the shingles 36 contained in the upper row, such as the row 37, are disposed exteriorly of an overlap the uppermost edges of the shingles 36 disposed in the next lowermost row, such as the row 38. This thus results in the shingles presenting an overlapping configuration similar to the manner in which wood shingles are conventionally arranged when used for roofing a building, such as a house. Further, the appearance of the overall roof construction is still further enhanced by staggering or offsetting the adjacent shingles within the rows. This is achieved by positioning the shingles so that the alternate shingles, such as the shingles designated 36A in FIG. 1, project downwardly a slight distance beyond the lower edge of the intermediate alternating shingles which have been designated 36B. This results in the shingles within the individual rows presenting an irregular or saw-toothlike appearance.

The complete box-like structure 37 is suitably fixedly secured to the mounting devices 14 by means of L-shaped brackets 41 which fixedly interconnect the opposite bars of each of the roof bars 16 to the opposed side panels 23 and 24. The brackets 41 are preferably disposed so that they are positioned in engagement with the spacers 33, with the brackets 41 being suitably secured to the spacers 33 and the mounting member 31 by any suitable means, such as by means of screws 42. The front and rear panels 26 and 27, respectively, having their opposite ends fixedly interconnected to the adjacent ends of the side panels 23 and 24 by means of nails, screws or the like.

As illustrated in FIGS. 2 and 3, the side panels and the end panels all slope upwardly and slightly inwardly relative to the vehicle. Further, the lowermost edge of the respective panels is disposed at an elevation which is closely adjacent the elevation of the van roof 17, with the lowermost edge of the respective panel being laterally horizontally displaced from the adjacent edge of the roof so that the resulting roof construction thus gives a somewhat overhanging appearance when mounted on the van.

Although a particular preferred embodiment of the invention has been disclosed in detail for illustrative purposes, it will be recognized that variations or modifications of the disclosed apparatus, including the rearrangement of parts, lie within the scope of the present invention.

The enbodments of the invention in which an exclusive property or privelege is claimed are defined as follows:

1. A roof construction adapted for attachment to the roof of a vehicle, particularly a van, comprising:

a box-like structure having a pair of opposed substantially rectangular side panels and a pair of opposed substantially rectangular end panels extending between and fixedly inteconnected to said pair of side panels;

each said panel being of substantially the same vertical height and terminating in an elongated upper edge which extends substantially horizontally, the upper edges of all of said panels lying within a common substantially horizontal plane, and the lowermost edge of said panels being positionable at an elevation similar to the elevation of the roof of the vehicle and respectively disposed adjacent an edge of said roof;

each said panel being disposed substantially vertically and having a base frame;

each said panel further having a plurality of shingles fixedly secured thereto; and mounting means fixedly connected to at least two of said panels for permitting said roof structure to be fixedly secured to the roof of a vehicle, said mounting means being positioned within the interior of said box-like roof structure so as to be substantially hidden from view when said roof structure is mounted on said vehicle.

2. A roof construction according to claim 1, wherein the shingles as secured to each panel are disposed in a plurality of rows which extend horizontally and longitudinally of each panel, the rows being substantially vertically spaced from one another, and the lower portion of the shingles as contained in an uppermost row overlapping the upper portion of the shingles contained in the next lowermost row.

3. A roof construction according to claim 1, wherein each panel extends upwardly and slopes slightly inwardly when the roof construction is mounted on the vehicle, and wherein the upper and lower ends of the box-like structure are open.

4. A roof construction according to claim 1, wherein each panel has a plurality of wood shingles fixedly secured to the respective panel, said wood shingles being disposed in a plurality of substantially horizontal rows which extend lengthwise of the respective panel, said rows being vertically spaced from one another and the individual shingles as contained in the adjacent rows vertically overlapping one another, and the lower edges of the shingles as contained in each row being positioned in a staggered relationship to cause the lower edge of the individual rows to have a saw-tooth appearance.

5. A roof construction according to claim 1, wherein said mounting means includes a plurality of mounting devices extending between and fixedly interconnected to the opposed pair of side panels, said plurality of mounting devices being spaced from one another in the longitudinally extending direction of said side panels, each said mounting device including an elongated bar-like support member extending substantially transversely between said side panels and having the opposite sides thereof fixedly connected to said side panels, and each of said bar members having a pair of spaced clamping devices mounted thereon for permitting said bar member to be fixedly secured to the roof of the vehicle.

6. In combination, a van-type vehicle and a roof construction fixedly secured to the roof of said vehicle and projecting upwardly therefrom, said roof construction comprising:
- a box-like roof structure having a pair of opposed substantially rectangular side panels, a substantially rectangular front panel extending between and fixedly interconnected to the forward ends of said side panels, and a substantially rectangular rear panel disposed opposite said front panel and extending between and fixedly interconnected to the rearward ends of said side panels;
- each said panel being disposed substantially vertically and being elongated in the horizontal direction, and said side panels being of greater length than said end panels;
- each said panel having base frame means and a plurality of shingles fixedly secured to said panel; and mounting means positioned within the interior of said box-like roof structure for fixedly connecting said roof structure to the roof structure for fixedly connecting said roof structure to the roof of said van and for positioning said roof structure directly adjacent the roof of said van so that said roof structure extends upwardly therefrom, said mounting means including a plurality of mounting devices positioned within the interior of said box-like roof structure and extending between and fixedly interconnecting an opposed pair of said panels, each of said mounting devices further having clamping means associated therewith for fixedly connecting same to the roof of said van.

7. The combination according to claim 6, wherein each of said mounting devices includes an elongated support bar extending transversely across said roof and means associated with the opposite ends of said bar for fixedly connecting same to a respective one of said side panels.

8. The combination according to claim 6, wherein each of the panels of said roof structure extend upwardly and slope slightly inwardly relative to the roof of said van, and the lowermost edge of said panels being positioned at an elevation similar to the elevation of the roof of said van but horizontally spaced outwardly from the adjacent edge of said roof.

9. The combination according to claim 6, wherein the top and bottom sides of said box-like roof structure are open, and wherein the shingles as fixedly secured to each of said panels are disposed in a plurality of vertically spaced and substantially parallel rows which extend longitudinally of the respective panels, the individual shingles in the adjacent rows having their adjacent edges disposed in overlapping relationship.

* * * * *